3,439,012
PRODUCING ALKYLLEAD HALIDE
Julian B. Honeycutt, Jr., Baton Rouge, La., assignor to Ethyl Corporation, New York, N.Y., a corporation of Virginia
No Drawing. Filed May 5, 1967, Ser. No. 636,285
Int. Cl. C07f 7/24
U.S. Cl. 260—437                    2 Claims

ABSTRACT OF THE DISCLOSURE $R_2PbCl_2$ (R=alkyl) is produced in high purity by reacting $R_4Pb$ with HCl in hot tetrahydrofuran. Excessive contamination of product by $R_3PbCl$ and $PbCl_2$ is avoided. $R_2PbCl_2$ is useful as a mildewcide, and as a chemical intermediate.

---

A convenient method of producing dialkyllead dichlorides involves reaction between tetraalkyllead and hydrogen chloride. However, in hydrocarbon reaction media the desired product is contaminated with excessive amounts of trialkyllead chloride, lead dichloride, or both. This necessitates tedious separations and purifications.

I have discovered that when the above reaction is conducted in tetrahydrofuran at about reflux temperature, dialkyllead dichloride of high purity is obtainable. Thus dialkyllead dichloride can be easily isolated from, or used in, the reaction system without encountering the contamination problems noted above. In fact, when anhydrous HCl is bubbled into a gently boiling solution of tetramethyllead in tetrahydrofuran, dimethyllead dichloride separates out as a white precipitate in purities in excess of 95 percent.

The tetrahydrofuran reaction medium may include relatively small proportions (e.g., 15 percent by volume, or less) of other innocuous solvents such as aliphatic or aromatic hydrocarbons. However, best results are achieved when using tetrahydrofuran of commercial purity as the sole diluent.

The reaction is conducted at about reflux temperature which of course will vary somewhat depending upon the prevailing pressure, the quantity of tetraalkyllead dissolved in the tetrahydrofuran reaction medium, and the identity and amount of co-solvents (if any). Tetrahydrofuran itself generally boils at ca. 64–66° C. and thus it is particularly convenient to continuously introduce dry HCl gas into a refluxing system of tetraalkyllead and tetrahydrofuran. The reaction is exothermic and thus heat energy requirements to achieve continuous reflux are usually not large. Reaction times are largely discretionary and may vary from an hour or less up to 3–4 hours or more. Because anhydrous HCl is the cheaper reactant it is usually used in considerable excess over the amount theoretically required to form the dialkyllead dichloride product. The extent of this excess is entirely discretionary.

Although the reaction may be conducted at pressures somewhat above and somewhat below atmospheric pressure, it is usually most convenient to operate at about atmospheric pressure.

The process is applicable to all tetraalkyllead compounds soluble in tetrahydrofuran at reflux temperature. Thus the invention may be applied to tetraethyllead, tetrapropyllead, tetraisopropyllead, tetrabutyllead, tetraisobutyllead, dimethyldiethyllead, ethyltrimethyllead, methyltriethyllead, and the like. Tetramethyllead is particularly suitable and is preferred.

EXAMPLE I

A solution of 0.25 mole of tetramethyllead in 500 ml. of tetrahydrofuran was boiled gently while HCl was bubbled into it for one hour after the appearance of a white solid. Thereupon, the solid was filtered off, dried and subjected to chemical analysis. The product was found to be dimethyllead dichloride of better than 95 percent purity.

Substitution of tetraethyllead and tetraisopropyllead for tetramethyllead in the above procedure provides respectively diethyllead dichloride and diisopropyllead dichloride of comparable purities.

EXAMPLE II

A solution of 20 ml. of tetramethyllead in 150 ml. of tetrahydrofuran was heated to gentle boiling on a steam bath. HCl was bubbled into the system while continuing the reflux. Thirty minutes after a white solid phase had begun to separate, the addition of HCl was discontinued. The mixture was filtered while hot, the solid product boiled for several minutes with fresh tetrahydrofuran and the product isolated by a second filtration while hot. Essentially pure dimethyllead dichloride was produced in over-all yield of 56.5 percent.

EXAMPLE III

A solution of 0.05 mole of tetramethyllead in 100 ml. of tetrahydrofuran was heated vigorously on a steam bath while bubbling dry HCl into the solution. HCl passage into the system was continued for one hour after the initial appearance of a separate white solid phase. Thereupon the reaction mixture was filtered while hot. The filtrate was treated with HCl gas while hot to produce another crop of white product. The products of these procedures were combined, boiled with fresh tetrahydrofuran, and recovered by a second filtration. The over-all yield of essentially pure dimethyllead dichloride was over 58 percent. It contained less than 5 percent of impurities.

As illustrated in Examples II and III, the dialkyllead dichloride produced in the tetrahydrofuran may be reboiled in fresh solvent in order to afford product which is virtually free from any trialkyllead chloride. Thus this additional step is helpful where even minute amounts of the trialkyllead chloride are undesired in the dialkyllead dichloride product. However, in most cases the amount of trialkyllead chloride co-produced in the one-step procedure of this invention (cf. Example I) is so small as to be of no practical consequence whatsoever.

Dialkyllead dichlorides may be used as mildewcides when added in small quantities (e.g., 1–2 percent by weight) to exterior oil base paints and other related protective coatings. In addition, dialkyllead dichlorides are convenient chemical intermediates in the synthesis of other useful alkyllead compounds. For example, they may be reacted with sodium acetate or sodium chloroacetate to produce such fungicides as diethyllead diacetate, dibutyllead diacetate, dimethyllead di-(monochloroacetate), and the like (see U.S. 3,142,614). Similarly, the dialkyllead dichlorides may be reacted with alkyl, alkenyl, and aryl alkali metal compounds (e.g., butyl lithium, phenyl sodium, hexyl sodium, octyl potassium, etc.) to form $R_2PbR_2'$ (R=alkyl from the dialkyllead dichloride; R'=hydrocarbyl from the alkali metal reactant). Such products are known to be antiknock agents (e.g., see U.S. 1,573,846). Other uses will be apparent to those skilled in the art.

I claim:
1. The process of producing dialkyllead dichloride which comprises reacting hydrogen chloride with tetraalkyllead in tetrahydrofuran at about reflux temperature.
2. The process of claim 1 wherein the tetraalkyllead is tetramethyllead.

References Cited

Calingaert et al.: J. Amer. Chem. Soc., vol. 67, pp. 190–192 (1945).
Chemical Abstracts, vol. 44, p. 1921 (1950).
Dessy et al.: J. Amer. Chem. Soc., vol. 83, pp. 1167–1173 (1961).
Gilman et al.: J. Amer. Chem. Soc., vol. 52, pp. 1975–1978 (1930).
Saunders et al.: J. Chem. Soc., pp. 923–925 (1949).
Heap et al.: J. Chem. Soc. (1947), pp. 2987–2988.
Weissberger et al.: Technique of Organic Chem. Organic Solvents, vol. VII, Interscience Publ. Inc., New York (1955), pp. 124–126.

TOBIAS E. LEVOW, *Primary Examiner.*

H. M. S. SNEED, *Assistant Examiner.*